United States Patent [19]
Idetsuki

[11] Patent Number: 6,047,809
[45] Date of Patent: Apr. 11, 2000

[54] METHODS OF GIVING INFORMATION THROUGH A MOVING HANDRAIL

[76] Inventor: Hirokazu Idetsuki, 820, Kamikurata-choo, Totsuka-ku, Yokohama-shi Kanagawa-ken, Japan

[21] Appl. No.: 08/890,925

[22] Filed: Jul. 10, 1997

[30] Foreign Application Priority Data

Aug. 23, 1996 [JP] Japan .................................. 8-260107

[51] Int. Cl.[7] .................................................. B65G 17/00
[52] U.S. Cl. ............................................................ 198/337
[58] Field of Search .................................. 198/337, 502.1

[56] References Cited

FOREIGN PATENT DOCUMENTS

| | | | |
|---|---|---|---|
| 623696 | 12/1962 | Belgium | 198/337 |
| 54-155595 | 12/1979 | Japan | 198/337 |
| 3-106792 | 5/1991 | Japan | 198/337 |
| 3-272993 | 12/1991 | Japan | 198/337 |
| 3-272995 | 12/1991 | Japan | 198/337 |

*Primary Examiner*—James R. Bidwell

[57] ABSTRACT

Method of displaying information material on a moving sidewalk or an escalator is disclosed. A handrail (2) is covered with a transparent plastic sheet(7), and a material (10) carrying information is inserted between the transparent plastic sheet and a top surface of the handrail so that the information can easily be replaced and displayed through the transparent plastic sheet. The transparent plastic sheet may be fastened to the handrail at a bottom end thereof by either a fastener (8,9) provided at the bottom end or by making a thickness larger at a bottom part (11) of the transparent plastic sheet, than that of other part of the transparent plastic sheet. The mater is carrying information may be glued to the handrail by adhesive having a character that no gluing marks are left after a removal of the material from the handrail.

3 Claims, 2 Drawing Sheets

METHODS OF GIVING INFORMATION THROUGH A MOVING HANDRAIL

BACKGROUND OF THE INVENTION

Advertisements people see when they are tiding on escalators or moving sidewalks (hereinafter referred to as an "Escalator") have been so far put on the sidewalls of newel areas or hung down from above. And so there is a defect that people, because of moving together with an Escalator, have almost no time to see such advertisements and that the advertisements cannot fulfil the purpose of giving information to people.

SUMMARY OF THE INVENTION

This invention was made to eliminate the defect above mentioned.

The handrails and the steps of an Escalator are always moving synchronously. Handrails are covered with a thin transparent plastic cover, and pieces of such thin sheets as a piece of paper carrying information on are inserted between the plastic cover and the handrail, so that people moving synchronously with the Escalator can see the advertisements.

Any plastic sheet will do if it is solid enough to cover handrails closely.

BRIEF DESCRIPTION OF THE DRAWINGS

Now, the figures of this invention is described as below.

---

Figure 1:
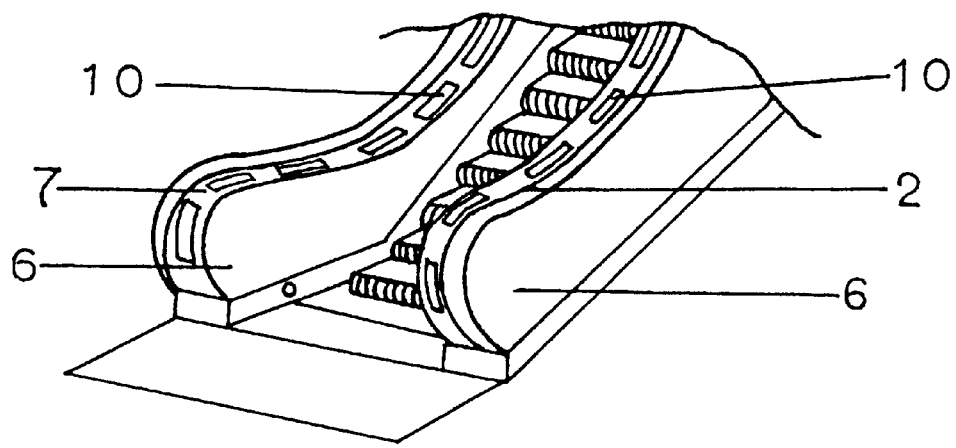
FIG. 1 is a fragmentary perspective view of an escalator to whose handrails pieces of sheets carrying information on are inserted.
Figure 2:
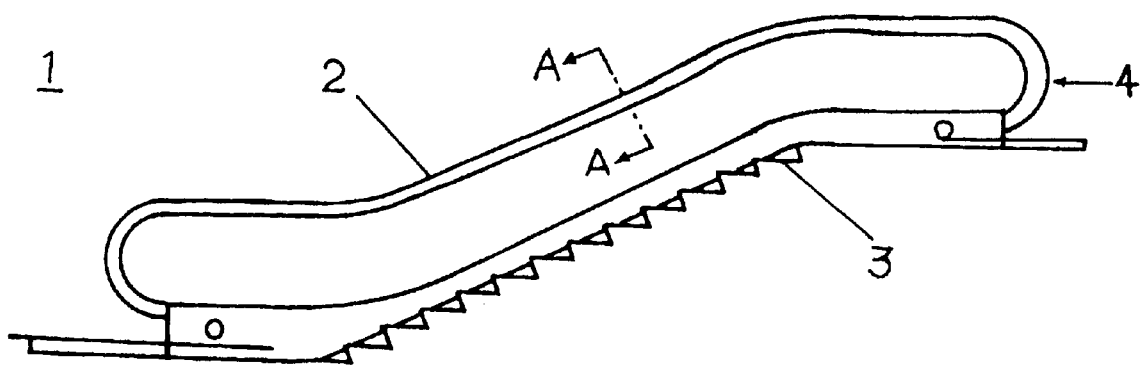
FIG. 2 is a schematic diagram of an escalator from sideward.
Figure 3:
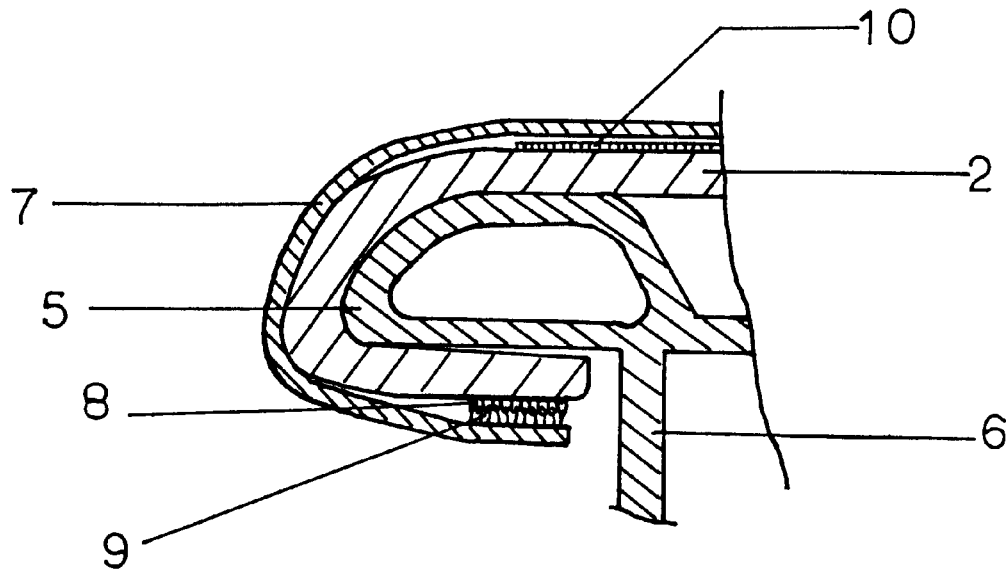
FIG. 3 is a A—A cross-sectional view of FIG. 2, which shows that a piece of sheet carrying information on is inserted between the handrail and a transparent plastic cover.

1 is an escalator
2 is a handrail.
3 is a step.
4 is a rotary part of a handrail.
5 is a guide part of a handrail.
6 is a settled wall of a guide part for a handrail.
7 is a transparent plastic sheet.
8 is a loop fastener.
9 is a hook fastener.
10 is a piece of sheet carrying information on.
11 is the part, which is enlarged at both ends of its width, of a soft-type
' plastic sheet.

---

DETAILED DESCRIPTION OF THE INVENTION

Transparent plastic sheets (7) are provided which are thick and solid enough to cover a handrail (2) to its backs. Their appropriate material is, for example, vinyl chloride or polypropylene. The appropriate thickness of the sheets is from 0.1 mm to 0.3 mm, and it will be reasonable to decide the thickness of sheets by taking into consideration its durability, its cost, or the manipulation of inserting pieces of sheets carrying information on.

The width of a plastic sheet is the width which can cover one back, the surface, and the other back of a handrail. The length of a plastic sheet is the same length as the fastened endless handrail, and is cut so long as for each end of the plastic sheet not to overlap each other at the joint.

Plastic sheets cover the handrail, and are fixed to it, and the part of a plastic sheet which contacts with the backs of the handrail is cut off in a V-shape so as not to crease at the rotary part (4) of the handrail when the handrail is moving.

Hook and loop fasteners are used in order to fix a plastic sheet (7) to the backs of the handrail (2). For example, 10 mm-wide hook and loop fasteners (8) (9) are cut at the length of 15 mm, and are settled with an adhesive at the interval of about 10 cm to the both backs of the handrail and to the corresponding parts of the plastic sheet.

The size of hook and loop fasteners and their interval at which hook and loop fasteners are settled are not limited to the size and the interval above mentioned, but may be decided according to the size and the length of the handrail of an Escalator.

To settle plastic sheets, it may be allowable to use female and male hooks.

The thickness of pictures, photos, or pieces of sheets carrying information on for advertisements or public relations (10) is limited to the thickness which will not prevent hook and loop fasteners of both handrails and a plastic sheet from meeting easily and being firmly settled. Such things will not give rise to trouble as printed pieces of paper, plastic sheets, or photos which will be generally available.

In additon, sheets carrying information on (10), whose back is glued at some places to the handrail with an adhesive the trail of which will disappear when torn off, will not slip out of place while the handrail (2) is moving.

Figure 4:
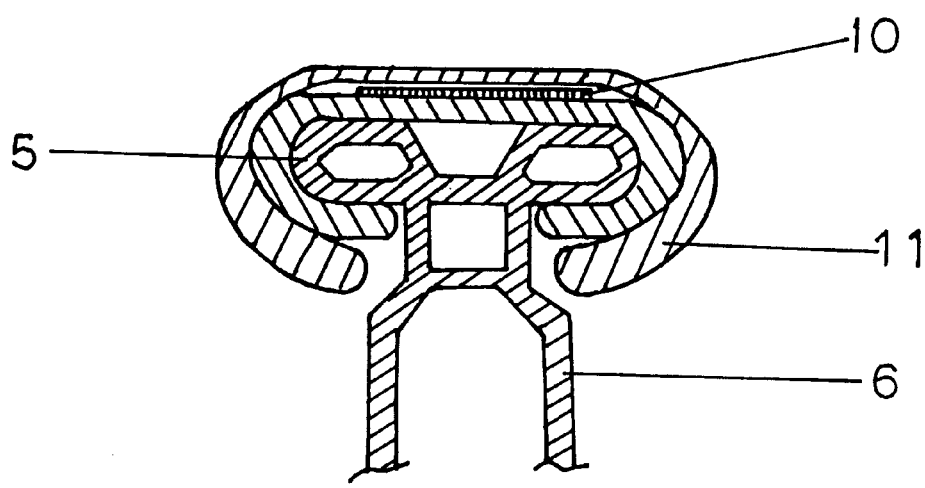
FIG. 4 is a cross-sectional view of a handrail, which shows that a piece of sheet carrying information on is inserted between the handrail and a transparent plastic cover which has another cross-sectional shape.

In another working example, soft-type vinyl chloride is used as a material of transparent plastic sheets(7), and the cover of handrails is such type of a cover that the thickness of the cover is increased at the places where it contacts with both backs of the handrail(2). The cross-sectional shape is shown as (11) of FIG. 4.

This cross-sectional shape, mentioned in the above paragraph, of a long handrail cover made of soft-type transparent plastic is made by extrusion molding. These covers are thicker at both ends of its width and have more elasticity, and so, when used as a cover of a handrail, these covers have enough strength to hold in place when fastenings are lessened or in case of no using female or male fasteners (8) (9). And it is easier for these covers to be installed into a handrail.

As above mentioned, that handrails (2) of an Escalator are covered with a transparent plastic sheet(7), and that various kinds of sheets carrying information on (10) are inserted between the plastic cover and the handrail enable passengers to watch the information for a rather long time while they are on an Escalator.

The cover used is a thin plastic, and fasteners are cheap. So public relations or advertisements are more effectively given to people at a lower cost.

What is claimed is:

1. A method of displaying information material on a moving sidewalk, wherein a handrail of the moving sidewalk is covered with a transparent plastic sheet fastened to the handrail at a bottom end of the handrail, and wherein a material carrying information is inserted between the transparent plastic sheet and a top surface of the handrail, and wherein the moving sidewalk further comprises a loop and hook fastener for fastening the transparent plastic sheet to the handrail.

2. A method of displaying information material on a moving sidewalk, wherein a handrail of the moving sidewalk is covered with a transparent plastic sheet fastened to the handrail at a bottom end of the handrail, and wherein a material carrying information is inserted between the transparent plastic sheet and a top surface of the handrail, and wherein a thickness of the transparent plastic sheet is made partially larger at a bottom thereof for holding the transparent plastic sheet together with the handrail.

3. A method of displaying information material on a moving sidewalk, wherein a handrail of the moving sidewalk is covered with a transparent plastic sheet fastened to the handrail at a bottom end of the handrail, and wherein a material carrying information is inserted between the transparent plastic sheet and a top surface of the handrail, and wherein the moving sidewalk further comprises a female and male hook fastener for fastening the transparent plastic sheet to the handrail.

\* \* \* \* \*